United States Patent [19]
Davis

[11] Patent Number: 6,115,816
[45] Date of Patent: Sep. 5, 2000

[54] OPTIMIZED SECURITY FUNCTIONALITY IN AN ELECTRONIC SYSTEM

[75] Inventor: Derek L. Davis, Phoenix, Ariz.

[73] Assignee: Intel Corporation, Santa Clara, Calif.

[21] Appl. No.: 09/080,742

[22] Filed: May 18, 1998

Related U.S. Application Data

[63] Continuation of application No. 08/768,674, Dec. 18, 1996, Pat. No. 5,818,939.

[51] Int. Cl.$^7$ ................................ H04L 9/00; H04L 9/08
[52] U.S. Cl. ...................... 713/153; 380/255; 380/277; 380/278; 380/283; 380/287; 713/150; 713/160; 713/189; 713/200; 713/201
[58] Field of Search ........................... 380/4, 9, 21, 49, 380/50, 59, 255, 259, 264, 270, 277–287; 713/150, 151, 153, 160, 161, 168, 171, 189, 200, 201

[56] References Cited

U.S. PATENT DOCUMENTS

| | | |
|---|---|---|
| 3,806,874 | 4/1974 | Ehrat . |
| 4,092,524 | 5/1978 | Moreno . |
| 4,215,421 | 7/1980 | Giraud . |
| 4,271,482 | 6/1981 | Giraud . |
| 4,310,720 | 1/1982 | Check, Jr. . |
| 4,467,139 | 8/1984 | Mollier . |
| 4,544,833 | 10/1985 | Ugon . |
| 4,549,075 | 10/1985 | Saada et al. . |
| 4,558,176 | 12/1985 | Arnold et al. . |
| 4,578,531 | 3/1986 | Everhart et al. . |
| 4,638,120 | 1/1987 | Herve . |
| 4,656,474 | 4/1987 | Mollier et al. . |
| 4,658,093 | 4/1987 | Hellman . |
| 4,811,393 | 3/1989 | Hazard . |
| 4,825,052 | 4/1989 | Chemin et al. . |
| 4,907,270 | 3/1990 | Hazard . |
| 4,910,774 | 3/1990 | Barakat . |
| 4,962,532 | 10/1990 | Kasiraj et al. . |
| 5,020,105 | 5/1991 | McCown et al. . |
| 5,142,579 | 8/1992 | Anderson . |
| 5,144,667 | 9/1992 | Rivest et al. . |
| 5,153,581 | 10/1992 | Hazard . |
| 5,191,611 | 3/1993 | Lang . |
| 5,214,702 | 5/1993 | Fischer . |
| 5,218,637 | 6/1993 | Angebaud et al. . |
| 5,231,666 | 7/1993 | Matyas . |
| 5,371,794 | 12/1994 | Diffie et al. . |
| 5,473,692 | 12/1995 | Davis . |
| 5,483,596 | 1/1996 | Rosenow et al. . |
| 5,495,533 | 2/1996 | Linehan et al. ........................... 380/21 |
| 5,499,295 | 3/1996 | Cooper . |
| 5,539,828 | 7/1996 | Davis . |
| 5,568,552 | 10/1996 | Davis . |
| 5,615,264 | 3/1997 | Kazmierczak et al. ..................... 380/4 |
| 5,764,762 | 6/1998 | Kazmierczak et al. ..................... 380/4 |
| 5,796,830 | 8/1998 | Johnson et al. ........................... 380/21 |
| 5,796,840 | 8/1998 | Davis . |
| 5,799,091 | 8/1998 | Lodenius .................................. 380/49 |
| 5,805,706 | 9/1998 | Davis . |
| 5,805,712 | 9/1998 | Davis . |

OTHER PUBLICATIONS

Struif, Bruno "The Use of Chipcards for Electronic Signatures and Encryption" in: Proceedings of the 1989 Conference on VLSI and Computer Peripherals, IEEE Computer Society Press, 1989, pp. 41155–4/158.

Dussé, Stephen R. and Burton S. Kaliski "A Cryptographic Library for the Motorola 56000" in: Damgård, I.M., Advances in Cryptology—Proceedings of Eurocrypt 90, Springer–Verlag, 1991, pp. 230–244.

(List continued on next page.)

*Primary Examiner*—Bernarr E. Gregory
*Attorney, Agent, or Firm*—Blakely, Sokoloff, Taylor & Zafman LLP

[57] ABSTRACT

An electronic system with security functionality that optimizes performance of the electronic system during cryptographic operations. In one embodiment, the electronic system includes a chipset having circuitry to perform bulk cryptographic operations and a circuitry physically removed from the chipset to control and manage operations of the chipset.

19 Claims, 10 Drawing Sheets

OTHER PUBLICATIONS

1989 Conference on VLSI and Computer Peripherals, IEEE Computer Society Press, 1989, pp. 41155–41158.

"As Good as Gold," by Thomas Zollver; Telecom Report International, (vol. 18, No. 4; 1995); http://www.jou.ufl.edu/siemens/articles/0495/495.htm.

"Intel Chipsets—Specification of Comparisons," posted on the Internet at http://www.sysopt.com/intelchip.html; no author; no date.

Mouly, et al., "The GSM System of Mobile Communications", 1992, pp. 7–9, 391–394, and 477–487.

OPTIMIZED SECURITY FUNCTIONALITY IN AN ELECTRONIC SYSTEM

This is a continuation of U.S. Pat. No. 5,818,930, issued Oct. 6, 1998 which matured from U.S. Pat. application Ser. No. 08/768,674, filed Dec. 18, 1996.

BACKGROUND OF THE INVENTION

1. Field of the Invention

The present invention relates to the field of cryptography. More particularly, the present invention relates to an electronic system that includes security functionality to optimize performance of the electronic system during cryptographic operations.

2. Description of Art Related to the Invention

In today's society, it is becoming necessary to protect information transmitted from a personal computer ("PC") so that the information is clear and unambiguous to an authorized receiver, but incomprehensible to any unauthorized persons. Additionally, it is becoming necessary to protect information stored within the PC to prevent unauthorized persons from downloading information onto a floppy disk, digital tape or other type of content storage device. Protection against unauthorized downloading may be accomplished by placing the information in an encrypted format prior to storage within the PC. Such encryption may be performed by either (i) a processing unit of the PC executing cryptographic software, or (ii) a cryptographic device solely connected to a system bus of the PC.

Referring to FIG. 1, the PC 100 designed in accordance with a conventional cryptographic implementation scheme is shown. The PC 100 includes a host processor 105 coupled to a chipset 110. The chipset 110 operates as a communicative pathway to both main memory 115 and an internal bus 120. A number of peripheral devices may be coupled to the internal bus 120 including a Personal Computer ("PC") card 125 that is used in this embodiment to provide cryptographic functionality to PC 100. Other peripheral devices include a parallel port device 126, a modem 127, and a disk controller 128 being an interface to a storage device such as a hard disk drive ("HDD") 129. This conventional architectural scheme may simplify the implementation of cryptographic functionality into an existing PC platform without an appreciable effect on various components already implemented therein; however, it adversely impacts performance of PC 100.

More specifically, a primary disadvantage associated with the conventional cryptographic implementation of FIG. 1 is that a cryptographic device 130, solely implemented within the PC 100 as a peripheral device such as a PC card, would adversely affect bandwidth of internal bus 120. The reason for the adverse effect is that performance of "bulk cryptographic operations" would require data to be transferred through internal bus 120 a multiple number of times. "Bulk cryptographic operations" are defined as operations involving (i) cryptography that supports high-volume throughput, (ii) hashing and the like. The cryptography utilized by bulk cryptographic operations typically involves symmetric key cryptography (e.g., encryption or decryption under Data Encryption Standard "DES" and other functions), or perhaps may involve asymmetric key cryptography.

For example, in order to store data in an encrypted format within a peripheral device such as HDD 129, the data residing in main memory 115 and having a non-encrypted format would be initially transferred to the peripheral device containing cryptographic device 130. Thereafter, cryptographic device 130 would encrypt the data and either transfer the encrypted data to HDD 129 or to main memory 115 for subsequent transmission to HDD 129. In either scenario, the data propagates through internal bus 120 at least two and perhaps three times, in contrast to the normal propagation of data directly from main memory 115 to HDD 129 in those cases when data is being stored in a non-encrypted format.

Referring now to FIG. 2, another embodiment of a PC 200, designed in accordance with a second conventional cryptographic implementation scheme, is shown. The PC 200 includes a host processor 205 coupled to a chipset 210, main memory 215 and an internal bus 220 as described above. Contrary to the conventional cryptographic implementation scheme of FIG. 1 in which cryptography is performed by the cryptographic device acting as a separate peripheral device, cryptographic circuitry is implemented into each of the peripheral devices $225_1$–$225_n$. ("n" being a positive whole number) connected to internal bus 220. This embodiment would avoid unacceptable bus bandwidth latency, but would impose other disadvantages. One disadvantage is that this embodiment increases the costs of each peripheral device $225_1$–$225_n$. Typically, these additional costs result from greater component costs due to increased circuitry and greater design and manufacturing costs. Another disadvantage that may occur is that this embodiment increases the likelihood of future compatibility problems as different cryptographic circuitry enters the marketplace.

Thus, it would be desirable to develop a system and method of operation that overcomes the above-described disadvantages.

SUMMARY OF THE INVENTION

In one embodiment, the present invention relates to an electronic system comprising a memory element and a chipset. The memory element stores a key recovered from a selected header portion of incoming information and a priority value associated with the key. The priority value establishes a priority for selecting to overwrite the key when loading a new key. The chipset is coupled to the memory element and includes circuitry to perform a bulk cryptographic operation on a content portion of the incoming information based on the key recovered from the selected header portion of the incoming information.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to an electronic system and method for optimizing system performance during cryptographic operations. In the following description, some terminology is used to discuss certain wellknown cryptographic functions. For example, an "electronic system" is a system including processing and internal data storage which may include, but is not limited to a computer such as laptops or desktops, servers, imaging devices (e.g., printers, facsimile machines, scanners, etc.), financial devices (e.g., ATM machines) and the like. "Information" is defined as one or more bits of data, address, and/or control. A "message" is generally defined as information being transferred during one or more bus cycles. A "key" is an encoding and/or decoding parameter used by conventional cryptographic algorithms such as for example, a Data Encryption Algorithm as specified in Data Encryption Standard (DES™) and the like. More particularly, a "session key" is a temporary key used in connection with symmetric cryptography to provide secure communications. A "digital signature" is a message typically used for authentication purposes. The term "secure" indicates that it is virtually computationally infeasible for an unauthorized individual to access information in a non-encrypted format or to successfully perpetuate fraud by tampering with such information.

Figure 1:
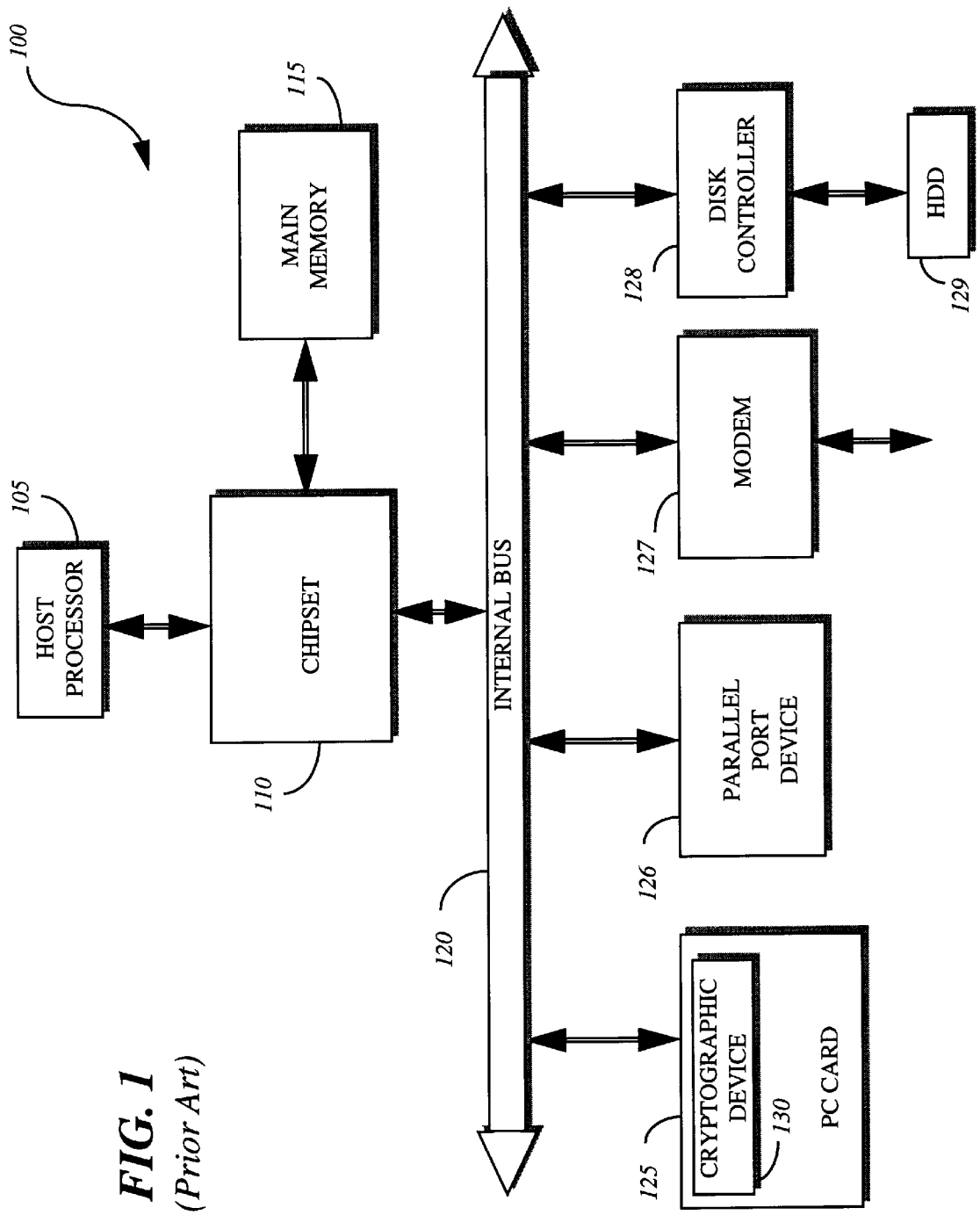
FIG. 1 is a conventional PC platform providing cryptographic functionality through a cryptographic device having a dedicated connection to an internal bus.
Figure 2:
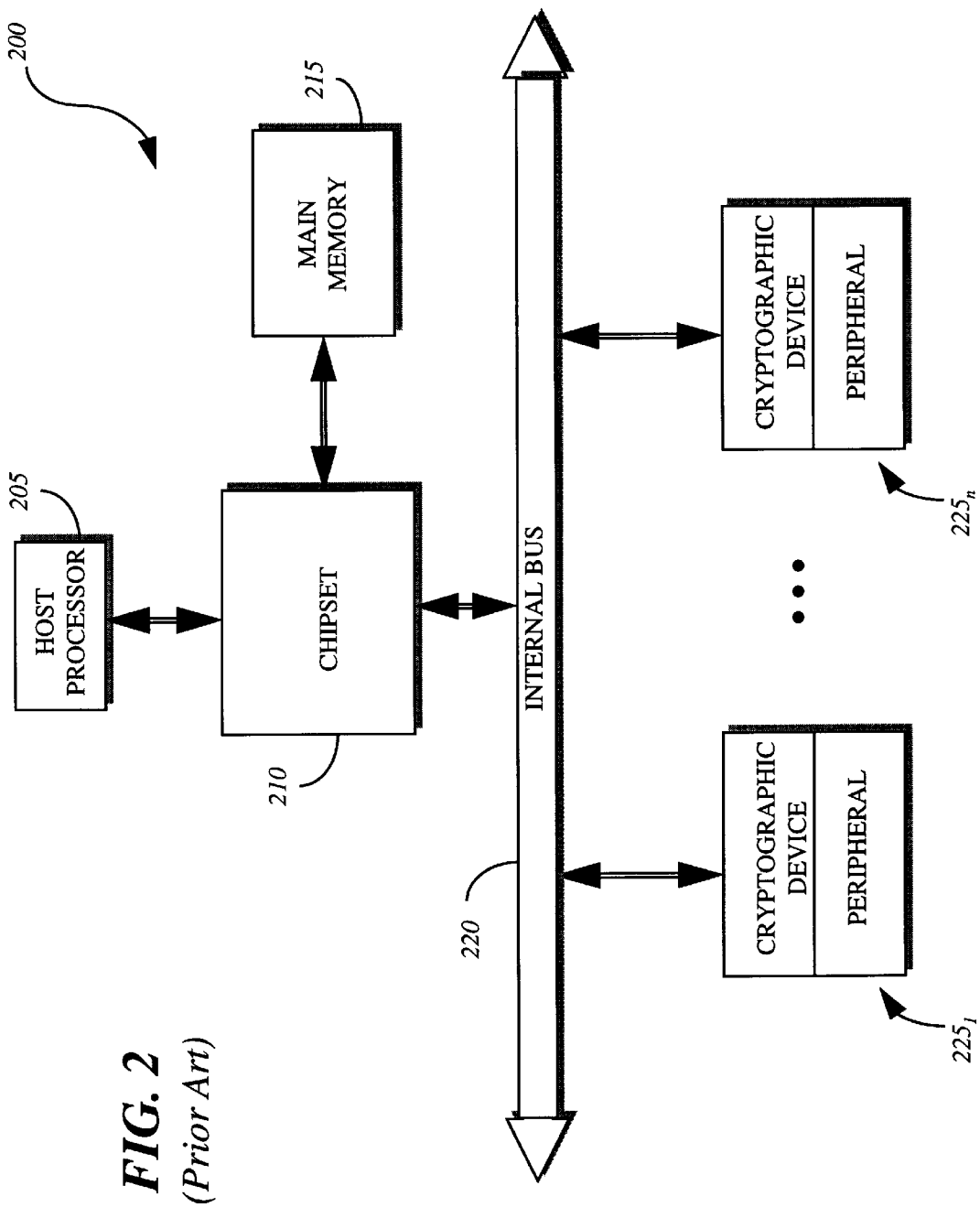
FIG. 2 is a conventional PC platform providing cryptographic functionality by implementing cryptographic devices into peripherals coupled to the internal bus.
Figure 3:
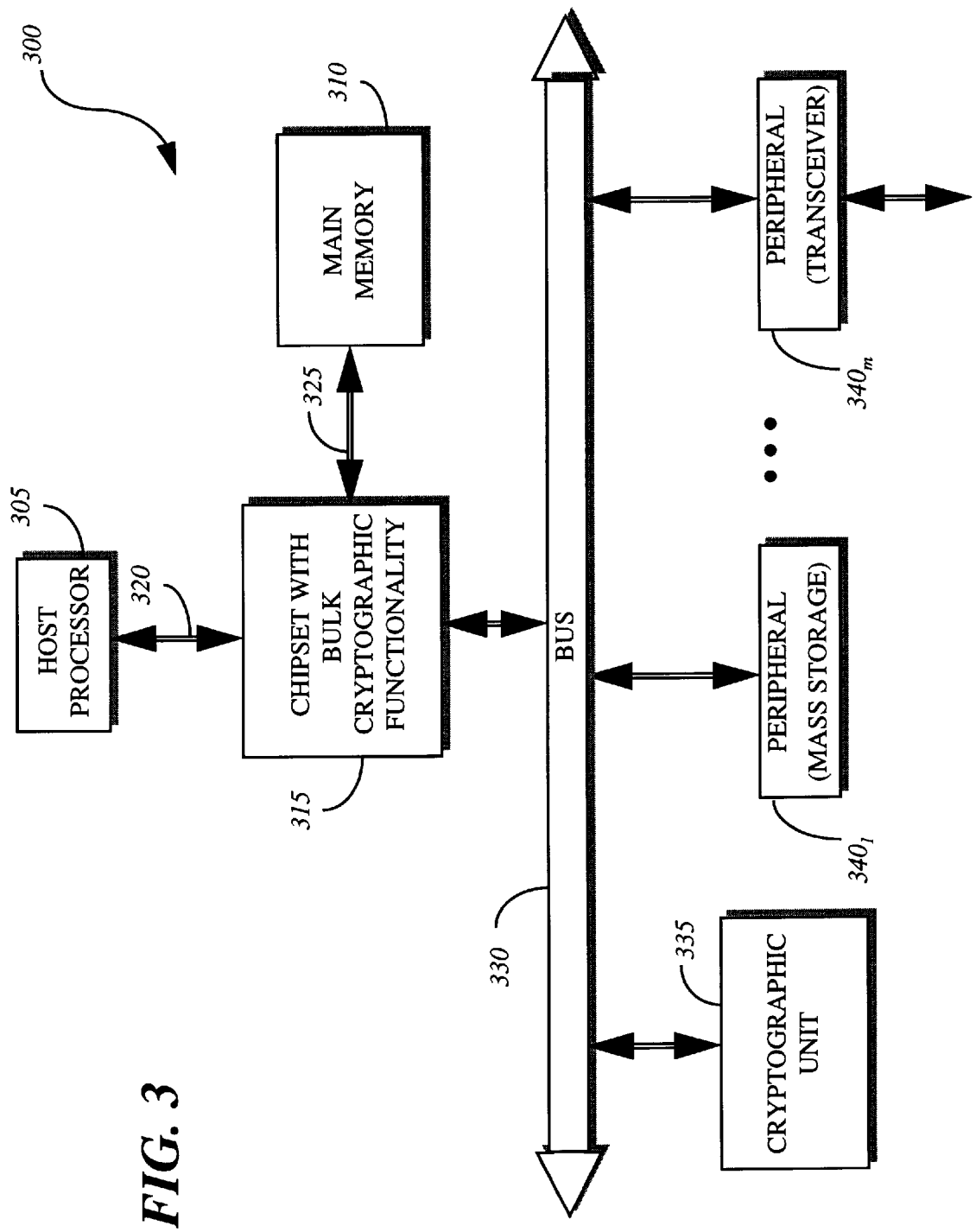
FIG. 3 is an embodiment of an electronic system providing improved performance during cryptographic operations by implementing partitioned secure cryptographic functionality in which bulk cryptographic operations are performed by the chipset which are controlled and managed by a separate cryptographic unit.

Referring to FIG. 3, an illustrative embodiment of an electronic system 300 employing the present invention is shown. The electronic system 300 comprises a host processor 305 and a main memory element 310 (e.g., dynamic random access memory "DRAM", static random access memory "SRAM", etc.) coupled together by a chipset 315. The chipset 315 is circuitry and/or software which operates as an interface between a plurality of buses, such as, for example a host bus 320, a memory bus 325 and bus 330. Besides logic used to perform its standard functionality of interconnecting multiple buses, which is not discussed in detail to avoid obscuring the present invention, the chipset 315 may require modification to include dedicated circuitry that performs bulk cryptographic operations on messages transferred through chipset 315. Such dedicated circuitry is included within the chipset, regardless of whether it is physically located within an integrated circuit package of the chipset or outside the chipset's package but coupled to both the chipset 315 and bus 330. An illustrative embodiment of such circuitry is shown in FIG. 4.

Referring still to FIG. 3, bus 330 provides a communication path between (i) a cryptographic unit 335 and (ii) a plurality of peripheral devices $340_1$–$340_m$ ("m" being a positive whole number). The bus 330 may be a Peripheral Component Interconnect (PCI) bus, Industry Standard Architecture (ISA) bus or any other type of bus architecture. It is contemplated that bus 330 is shown as a single bus (e.g., the PCI bus), but it may be multiple buses coupled together through bridge circuitry in which each peripheral device $340_1$–$340_m$ is coupled to at least one of the multiple buses.

The cryptographic unit 335 includes circuitry to control and manage bulk cryptographic operations performed by the chipset 315. This is accomplished through the use of secret and/or session keys to establish secure communications with the chipset 315. Additionally, peripheral devices $340_1$–$340_m$ may include, but are not limited to, a mass storage device $340_1$(e.g., a hard disk drive, a CD ROM player, CD recordable player, digital tape drive, a floppy disk drive, a digital video disk player, etc.), a transceiver device $340_m$ (e.g., a network interface circuit card, a modem card, etc.) and the like.

Figure 4:
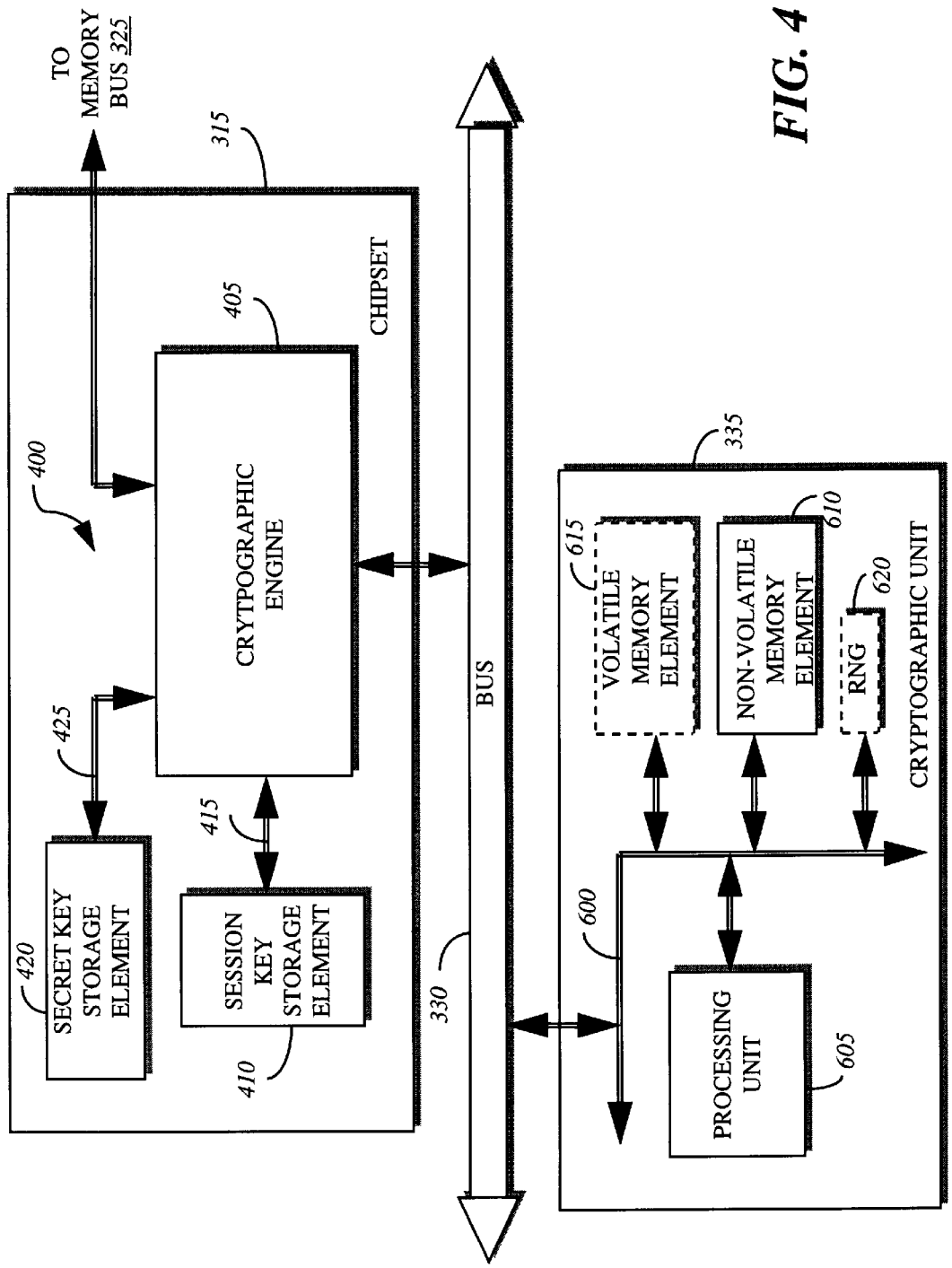
FIG. 4 is a more-detailed embodiment of the chipset and the cryptographic unit.

Referring now to FIG. 4, illustrative embodiments of chipset 315 and cryptographic unit 335 are shown. The chipset 315 includes circuitry 400 that performs bulk cryptographic operations on digital information propagating through the electronic system. The circuitry 400 includes a cryptographic engine 405 coupled to bus 330 and memory bus 325, a session key storage element 410 and a secret key storage element 420. The cryptographic engine 405 may possess a unique communication path to main memory via memory bus 325 or share this communication path with other circuitry through conventional multiplex hardware. The session key storage element 410 and the secret key storage element 420 are coupled to cryptographic engine 405 through signal lines 415 and 425, respectively. The signal lines 415 and 425 may have the same or different bit widths, ranging from one-bit to r-bits ("r" being a positive whole number, r>1).

The cryptographic engine 405 is circuitry (e.g., hardware or firmware) that performs a bulk cryptographic operation on input data based on a key supplied by either the session key storage element 410 or secret key storage element 420, or based on a hash function if hashing is performed. The session key storage element 410 is used to store session keys that are used when performing bulk cryptographic operations on data input into the cryptographic engine 405. More specifically, these bulk cryptographic operations may use the session key to decrypt data transferred to main memory from one of the peripheral devices or to encrypt data transferred to one of the peripheral devices for storage or transmission. Such encryption or decryption may be performed through Data Encryption Algorithm or any other symmetric cryptographic functions, while hashing may be performed through cryptographic hash functions such as Message Digest 5 (MD5™) provided by RSA Data Security, Inc. of Redwood City, Calif., Secure Hash Algorithm (SHA-1™) specified by the National Institute of Standards and Technology of Washington, D.C., and other types of hash functions.

Figure 5:
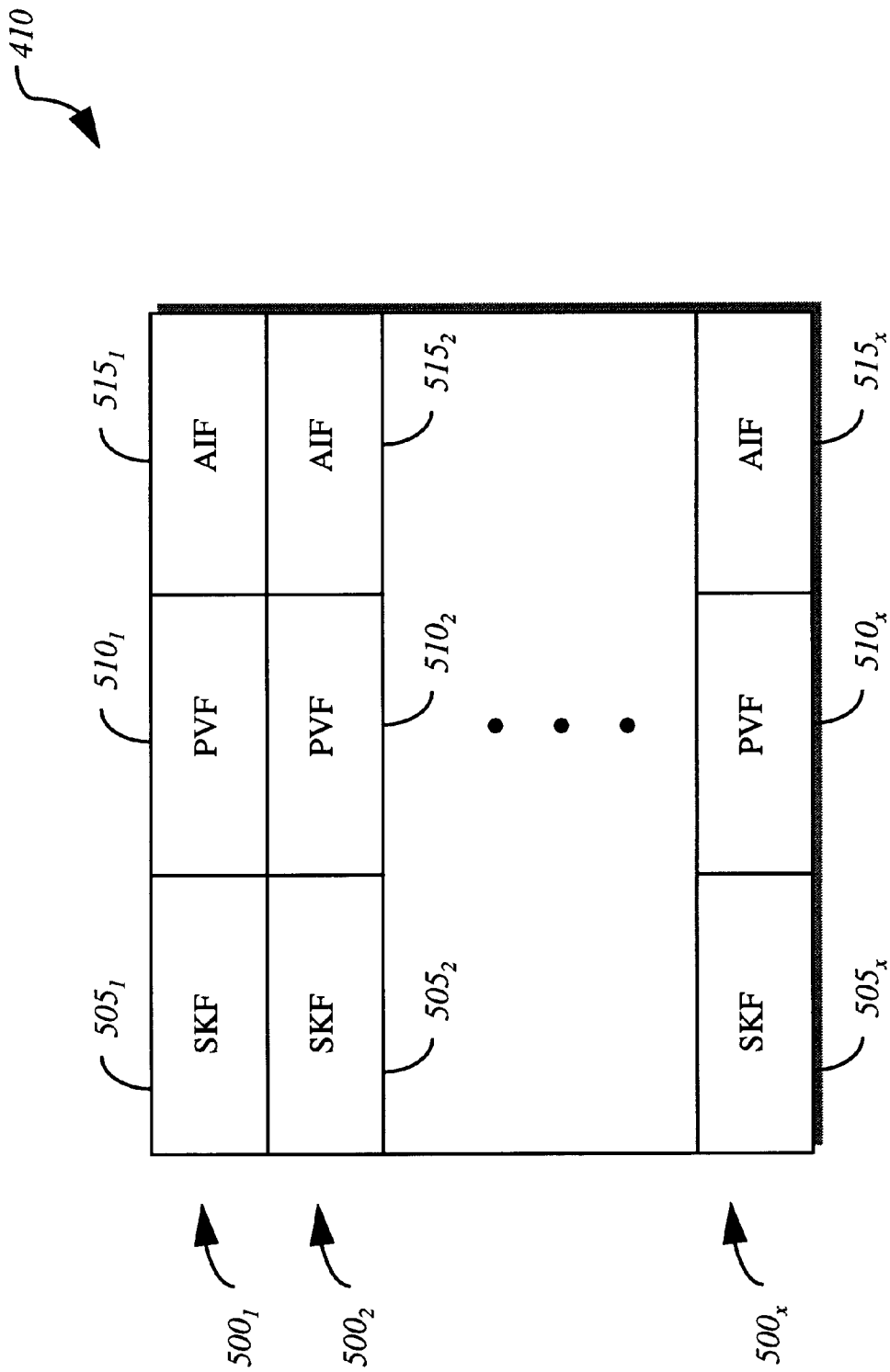
FIG. 5 is an illustrative block diagram of the session key storage element.

Typically, the session key storage element 410 is implemented with volatile memory to contain one or more session key(s). In one embodiment, the session key storage element 410 may be configured as cache memory that supports one or more session keys although such caching architecture is not required. As generally shown in FIG. 5, one embodiment of the session key storage element 410 includes multiple storage entries $500_1$–$500_x$("x" being a positive whole number), accessible by bus lines coupled thereto (not shown). Each storage entry $500_1$–$500_x$ pertains to one unique key and provides sufficient storage to support at least three fields associated with that key; namely, a session key field (SKF) $505_1$–$505_x$, a priority/validity field (PVF) session key field $505_1$–$505_x$ is used to contain different session keys used when performing bulk cryptographic operations. The priority/validity field $510_1$–$510_x$ is used to identify an "invalid" entry and to establish a priority in determining which entries may be overwritten when loading new session keys. The address information field(s) $515_1$–$515_x$ include information relating to the source and destination addresses of a message being processed.

Referring back to FIG. 4, cryptographic unit 335 is used to control and manage bulk cryptographic operations performed by the chipset 315 as well as to support a secure communication path and interconnection with the chipset 315 and possibly other systems. The cryptographic unit comprises a bus 600 interconnecting a processing unit 605, non-volatile memory element 610, an optional volatile memory element 615 (as denoted by dashed lines), and an optional random number generator (RNG) 620 (as denoted by dashed lines). The processing unit 605 may include, but is not limited to a processor, a micro-controller, a state machine logic circuit and the like. The non-volatile memory element 610 contains at least a shared secret key, which is also imprinted into the secret key storage element 420 normally during manufacture when the cryptographic unit 335 and the chipset are powered up and in communication with each other. This imprinting may be performed by an original equipment manufacturer (OEM) of the electronic system, suppliers of the chipset and/or cryptographic unit, or a specified third party.

The shared secret key is generated by random number generator 620, if implemented, or an externally available random number generator. It is contemplated that the shared secret key may be produced after manufacture by an OEM or a trusted authority (e.g., trade association, governmental entity or other "trusted" entity). As discussed, the shared secret key may be used by both chipset 315 and cryptographic unit 335 to encrypt and decrypt information or to establish a "session" key used for that purpose. It is further contemplated that volatile memory element 615, if implemented, may be utilized as temporary storage by the processing unit 605.

Figure 6:
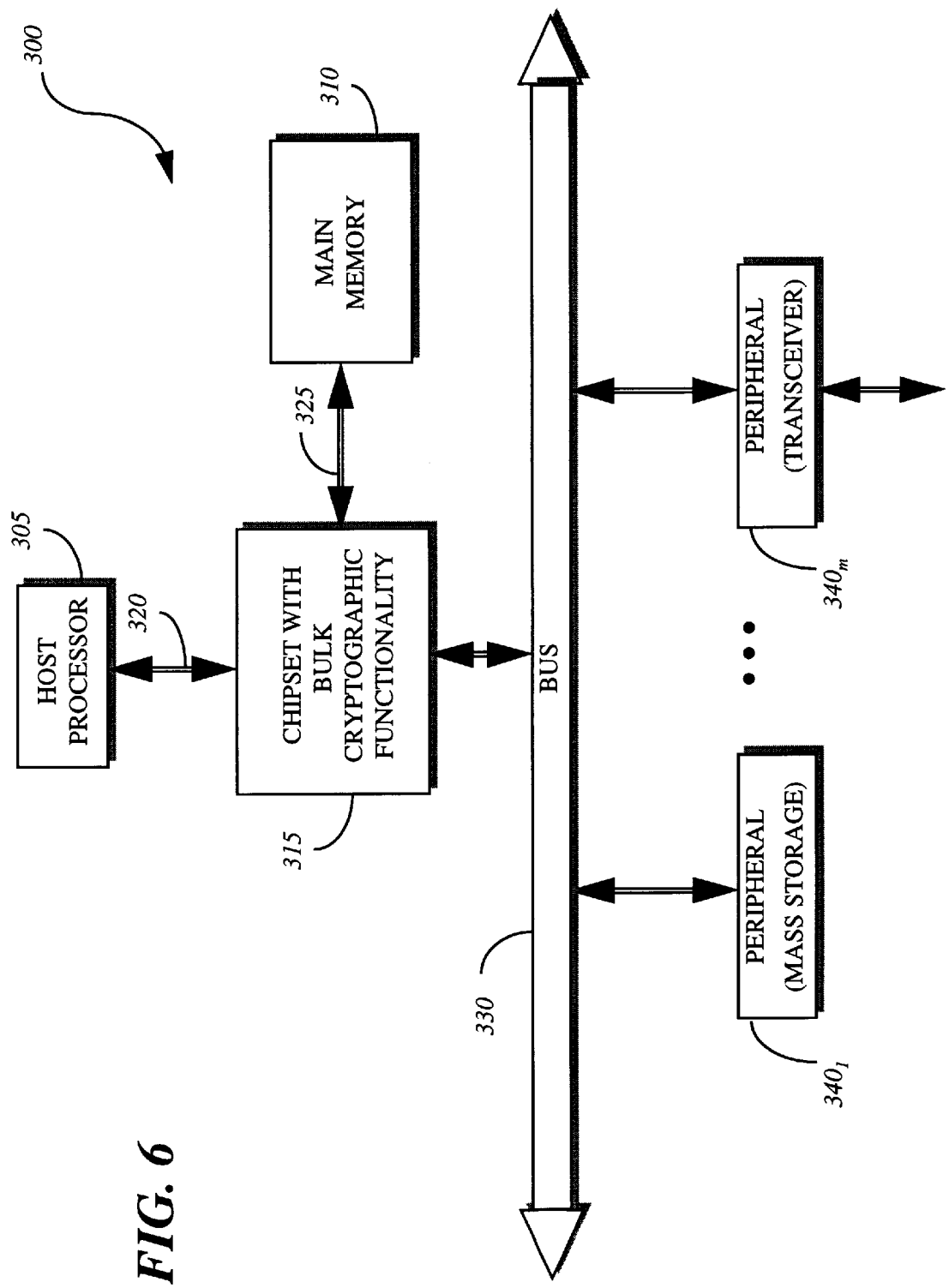
FIG. 6 is another embodiment of an electronic system providing improved performance during cryptographic operations by implementing partitioned secure cryptographic functionality in which bulk cryptographic operations are performed by the chipset which are controlled and managed by the host processor.

Referring to FIG. 6, another embodiment of the electronic system providing improved performance during cryptographic operations is shown. The electronic system is similar to that shown in FIG. 3 with the exception that no cryptographic unit is implemented to control and manage the chipset. Rather, it is contemplated that the host processor may control and manage the performance of bulk cryptographic operations by the chipset 315 through a combination of software and hardware.

Figure 7:
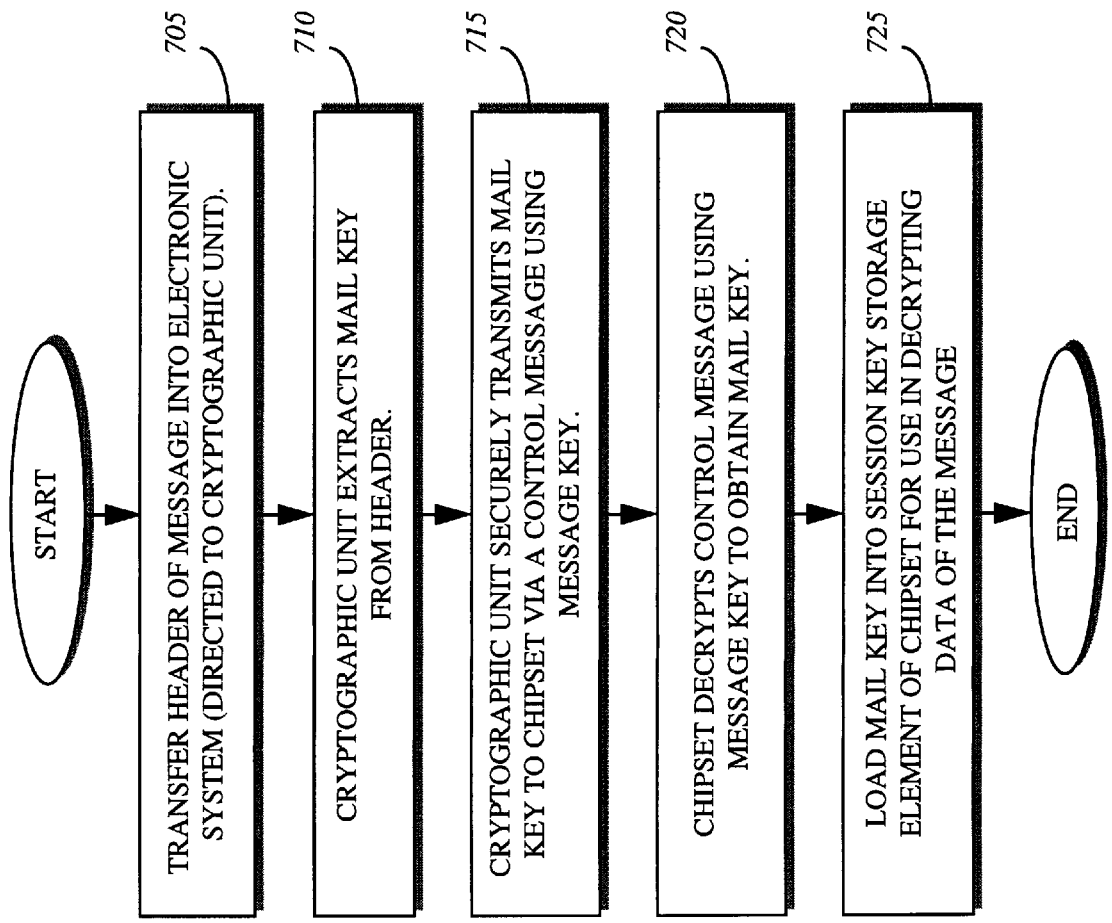
FIG. 7 is an illustrative flowchart of the general cryptographic operations performed by both the chipset and either the cryptographic unit or host processor in decrypting information obtained from a remote source.

Referring now to FIG. 7, a flowchart illustrating the operations of an electronic system, implemented with partitioned data security functionality, to decrypt a message in an encrypted format received by a transceiver of the electronic system is shown. Upon receiving an encrypted message, a header of the message is transferred to the cryptographic unit (705). The header includes a session key (hereinafter referred to as a "mail key") encrypted with other information. The mail key is extracted from the header of the message by decrypting the header with a key contained in memory of the cryptographic unit (710). The key may be a private key associated with the electronic system if public/private key cryptography is used to secure communications between the electronic system and other networked systems. In the case that the host processor is performing the functions of the cryptographic unit in controlling the bulk cryptographic operations of the chipset, the header is processed by the host processor using a key to which the host processor has access.

Next, the mail key is securely transmitted to the chipset, destined for the session key storage element (715). This secure transmission is accomplished by the cryptographic unit or host processor producing a control message being the mail key encrypted under a message key. The "message key" is either the shared secret key or a session key established through the use of the shared secret key. The control message can be transmitted to the chipset, which decrypts the control message, using the message key, to recover the mail key. Subsequently, the mail key is loaded into the session key storage element (720 and 725). Thereafter, the contents of the message can be transferred through the chipset and decrypted for transmission to main memory.

Figure 8:
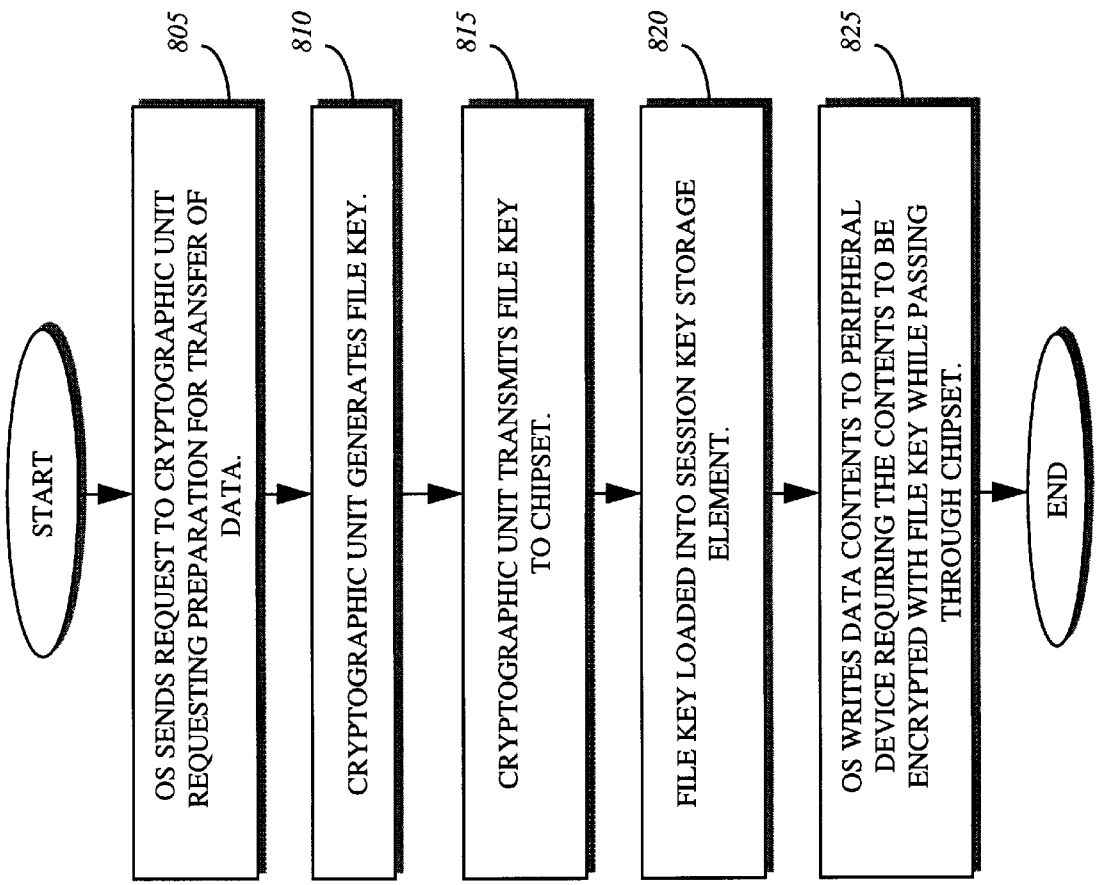
FIG. 8 is an illustrative flowchart of cryptographic operations performed by both the chipset and either the cryptographic unit or host processor in encrypting information contained in main memory for storage within the electronic system.

Referring to FIG. 8, a flowchart illustrating the operations of the electronic system, implemented with partitioned data security functionality, to encrypt data before storage in a peripheral device such as HDD, is shown. First, the operating system of the electronic system sends a request to the cryptographic unit (or host processor) requesting preparation to transfer contents of main memory to a hard disk controller (805). The cryptographic unit (or host processor) generates a session key for encryption, referred to as a "file key", and securely transmits the file key to the chipset through the use of the message key (810 and 815). The chipset places the file key in the session key storage element (820). Thereafter, the OS writes the data contained in main memory to the hard disk controller and the chipset encrypts the data, forming at least a portion of the message, with the file key as it propagates there through. Thus, the data is stored in an encrypted format on HDD (825).

Figure 9:
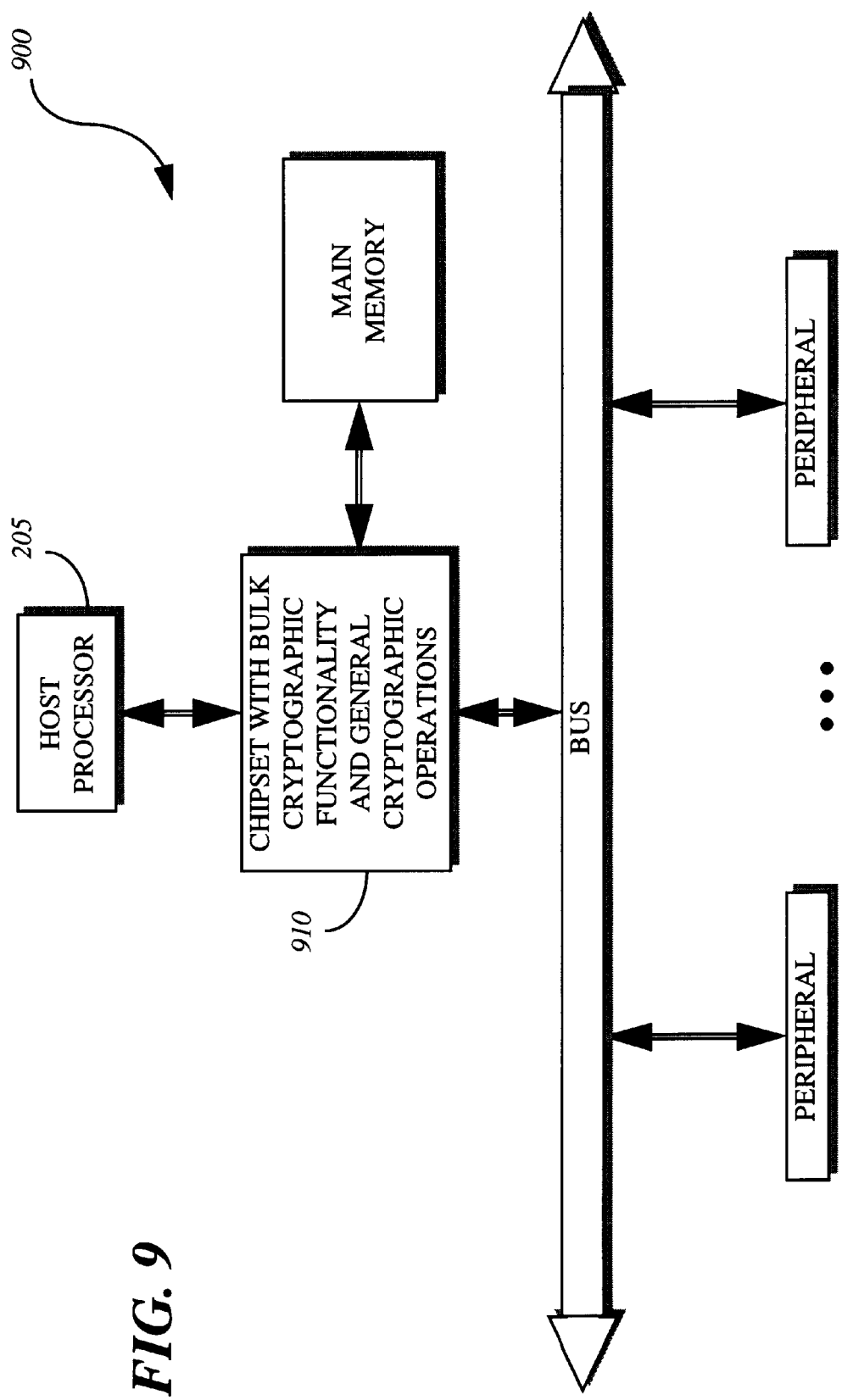
FIG. 9 is yet another embodiment optimizing system performance during cryptographic operations by implementing cryptographic circuitry onto the chipset.

Referring now to FIG. 9, it is contemplated that another architectural embodiment of an electronic system 900 employing the present invention may be used, absent partitioned data security functionality as set forth in FIGS. 3–7. The electronic system 900 includes a chipset 910 performing bulk cryptographic operations and internally controlling these operations. Thus, a dedicated cryptographic unit for control purposes would not be required.

Figure 10:
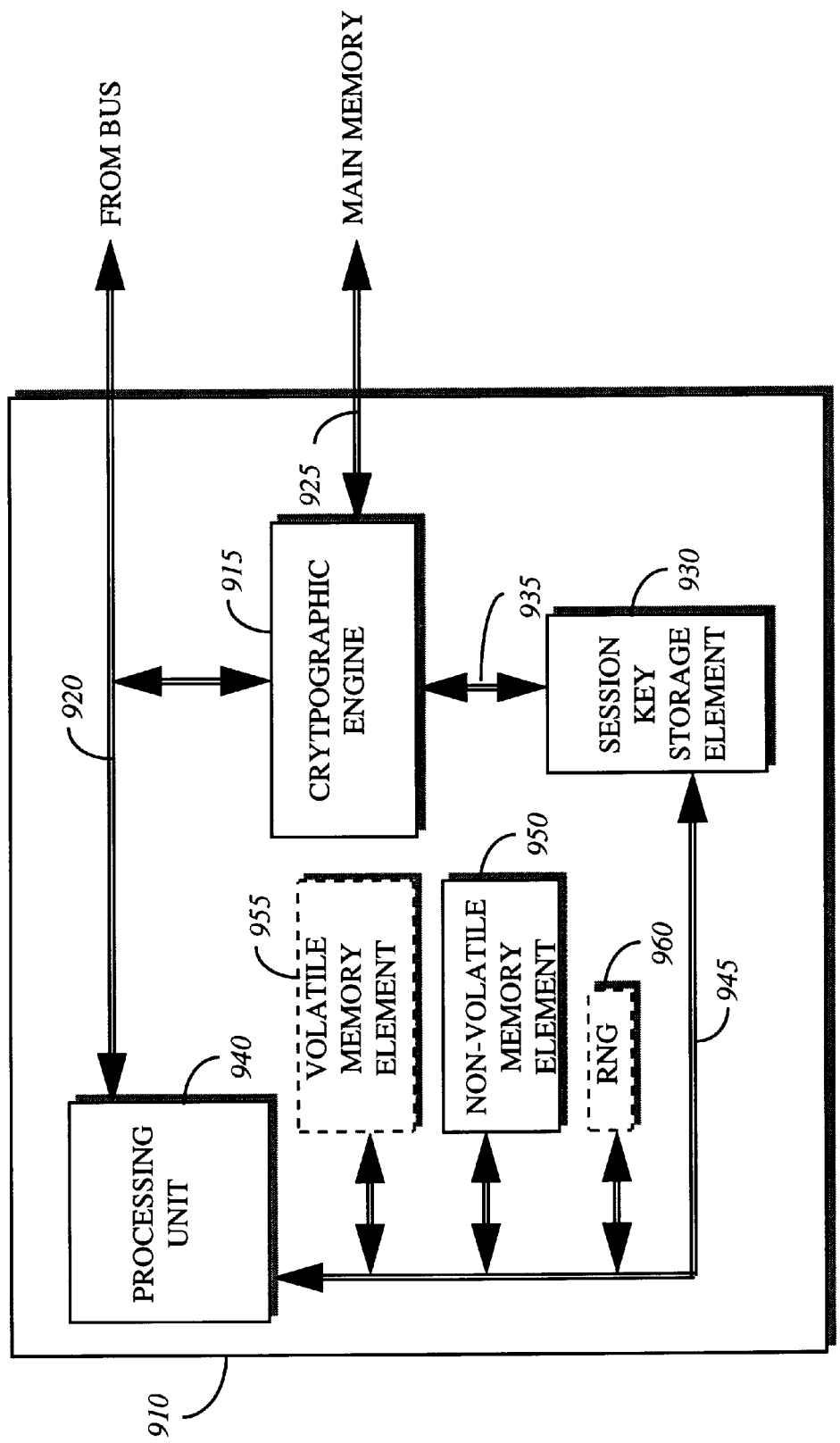
FIG. 10 is a more-detailed embodiment of the chipset of FIG. 9.

Referring to FIG. 10, a more-detailed block diagram illustrating one embodiment of the chipset 910 is shown. Similar to the chipset illustrated in FIG. 4, this chipset 910 includes (i) a cryptographic engine 915 coupled to both the bus and the memory bus through internal buses 920 and 925 respectively, and (ii) a session key storage element 930 coupled to the cryptographic engine 915 through a dedicated bus 935. However, chipset 910 further comprises circuitry of controlling and managing the bulk cryptographic operations performed by the cryptographic engine 915. This circuitry includes a processing unit 940 (e.g., a processor, state machine, microcontroller, etc.), coupled to both internal bus 920 and another internal bus 945 coupled to session key storage element 930, and memory capable of storing key information (e.g., public/private key pair or other key information), cryptographic software, or any other data. Preferably, the memory includes a non-volatile memory element 950 coupled to internal bus 945 and/or volatile memory 955. Optionally, as indicated by dashed lines, the chipset 910 may include a random number generator 960, coupled to internal bus 945, to internally produce key information.

In general, chipset 910 differs from chipset 315 of FIGS. 3–4 in that it is implemented with circuitry and software to control and manage bulk cryptographic operations by the chipset 910 in lieu of external control by the cryptographic unit of FIGS. 3–4. The advantage of internalizing both the circuitry for performing the bulk cryptographic operations and the circuitry for controlling and managing these operations within the same physical package is that it allows for the elimination of additional storage space for a shared secret key (e.g., the shared key storage element). The reason is that there is lesser need for a cryptographically secure communication because the processing unit is not externally located from the chipset as in partitioned functionality.

For illustrative purposes, the operations of the chipset 910 are discussed in relation to the receipt of an external message (e.g., an electronic mail message). A portion of the external message, namely the header, is transferred from the transceiver to the host processor. Upon the host processor determining that the message is encrypted, it sends the header to the chipset 910. The chipset 910 routes the header to the processing unit 940, which would decrypt the header using key information stored within internal memory of the chipset 910, most likely non-volatile memory element 950. The key information would likely be a private key of the electronic system contained within the chipset 910, although the key may be a symmetric key if symmetric key cryptography is used.

Upon decrypting the header, the processing unit 940 would extract a mail key from the header and this mail key would be transferred from the processing unit 940 to the session key storage element 930 through internal bus 945. Thereafter, the host processor would arrange the rest of the data forming the external message to be transferred through the cryptographic engine 915 via internal bus 920. The cryptographic engine 915 would decrypt the data of the external message using the mail key, provided by the session key storage element 930 via internal bus 935, and subsequently route the non-encrypted data to main memory via internal bus 925.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An electronic system comprising:
a memory element to store a key recovered from a selected header portion of incoming information and a priority value associated with the key, the priority value establishing a priority for selecting to overwrite the key when loading a new key; and
a chipset coupled to the memory element, the chipset including circuitry to perform a bulk cryptographic operation on a content portion of the incoming information based on the key recovered from the selected header portion of the incoming information.

2. The electronic system according to claim 1, wherein the bulk cryptographic operation includes a hash operation.

3. The electronic system according to claim 1, wherein the memory element includes a volatile memory.

4. The electronic system according to claim 1, wherein the memory element a non-volatile memory.

5. An electronic system comprising:
at least one peripheral device;
a chipset in communication with the at least one peripheral device, the chipset including circuitry to perform a bulk cryptographic operation on a content portion of incoming information provided by the at least one peripheral device based on a key recovered from a header portion of the incoming information; and
a first storage element coupled to the chipset to store the key and a priority value associated with the key, the priority value establishing a priority for selecting to overwrite the key when loading a new key.

6. The electronic system according to claim 5 further comprising a cryptographic unit to establish a secure communication link with the chipset and to provide the key to the chipset to enable the chipset to perform the bulk cryptographic operations.

7. The electronic system according to claim 6, wherein the chipset includes:
a cryptographic engine; and
second storage element coupled to the cryptographic engine, the second storage element capable of containing at least a secret key also imprinted in the cryptographic unit.

8. The electronic system of claim 5, wherein the at least one peripheral device includes a hard disk drive.

9. The electronic system of claim 5, wherein the at least one peripheral device includes one of a compact disk read only memory (CD ROM) player, a compact disk (CD) recordable player, and a digital tape drive.

10. The electronic system of claim 5, wherein the at least one peripheral device includes a digital video disk (DVD) player.

11. The electronic system of claim 5, wherein the at least one peripheral device includes a modem.

12. The electronic system of claim 5, wherein the at least one peripheral device includes a network interface circuit (NIC) card.

13. A chipset comprising:
circuitry to decrypt a predetermined header portion of incoming information to recover a key;
a first storage element to store the key, the first storage element including a plurality of storage entries, each of the plurality of storage entries including a key field to store a key and a priority field to store a priority value associated with the key, the priority value establishing a priority for determining which storage entries to overwrite when loading new keys; and
a cryptographic engine to perform bulk cryptographic operations on a content portion of the incoming information using the key.

14. The chipset of claim 13, wherein the first storage element includes volatile memory.

15. The chipset of claim 13, wherein the bulk cryptographic operations performed by the cryptographic engine include hashing operations producing a hash result being lesser in bit size than the incoming information.

16. The chipset of claim 13, wherein the key is a session key.

17. The chipset of claim 16 further comprising a second storage element to contain a symmetric key.

18. The chipset of claim 17, wherein the second storage element includes a non-volatile memory.

19. The chipset of claim 18 further comprising a cryptographic unit to provide control information to the chipset to perform the bulk cryptographic operations.

\* \* \* \* \*

UNITED STATES PATENT AND TRADEMARK OFFICE
CERTIFICATE OF CORRECTION

PATENT NO.   : 6,115,816                                                Page 1 of 1
DATED        : September 5, 2000
INVENTOR(S)  : Davis It is certified that error appears in the above-identified patent and that said Letters Patent is hereby corrected as shown below:

<u>Column 7,</u>
Line 63, after "element", insert -- includes --.

Column 8,
Line 18, before "second", insert -- a --.

Signed and Sealed this

Eighth Day of October, 2002

*Attest:*

*Attesting Officer*

JAMES E. ROGAN
*Director of the United States Patent and Trademark Office*